US012681899B2

(12) United States Patent
He et al.

(10) Patent No.: US 12,681,899 B2
(45) Date of Patent: Jul. 14, 2026

(54) DATA PROCESSING METHOD, COMPUTER DEVICE, AND STORAGE MEDIUM

(71) Applicant: BEIJING DIPEAK TECHNOLOGY CO., LTD, Beijing (CN)

(72) Inventors: Changhua He, Beijing (CN); Xirong Jiang, Beijing (CN); Yu Hu, Beijing (CN); Chenfan Xiao, Beijing (CN)

(73) Assignee: BEIJING DIPEAK TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 19/149,557

(22) PCT Filed: May 31, 2024

(86) PCT No.: PCT/CN2024/096530
§ 371 (c)(1),
(2) Date: Jul. 21, 2025

(87) PCT Pub. No.: WO2024/255613
PCT Pub. Date: Dec. 19, 2024

(65) Prior Publication Data
US 2026/0119454 A1      Apr. 30, 2026

(30) Foreign Application Priority Data
Jun. 15, 2023    (CN) .......................... 202310708563.5

(51) Int. Cl.
*G06F 16/172*        (2019.01)
*G06F 16/13*         (2019.01)
(52) U.S. Cl.
CPC ............ *G06F 16/172* (2019.01); *G06F 16/13* (2019.01)

(58) Field of Classification Search
CPC .............................. G06F 16/172; G06F 16/13
See application file for complete search history.

(56) References Cited

U.S. PATENT DOCUMENTS

2018/0349095 A1    12/2018  Wu et al.
2020/0183905 A1*   6/2020   Wang .................. G06F 16/2246
(Continued)

FOREIGN PATENT DOCUMENTS

CN        108733306 A      11/2018
CN        111352908 A      6/2020
(Continued)

*Primary Examiner* — Gary W. Cygiel
(74) *Attorney, Agent, or Firm* — Bayramoglu Law Offices LLC

(57) ABSTRACT

A data processing method includes: when detecting that a first storage file in an ith layer of a target storage system meets a preset data merging condition, determining in an (i+1)-th layer a second storage position having a data merging relationship with a first storage position of the first storage file, and determining a second storage file located at the second storage position in the (i+1)-th layer; on the basis of a data comparison result between first data in the first storage file and second data in the second storage file, determining target write-in data configured to be written into a third storage file corresponding to the second storage file, and writing the target write-in data into the third storage file; and determining a target storage virtual file corresponding to the second storage file, and establishing, in the target storage virtual file, index information corresponding to the third storage file.

20 Claims, 2 Drawing Sheets

S101

In response to detecting that a first storage file in an i-th layer of a target storage system meets a preset data merge condition, determine, in an (i+1)-th layer, a second storage position having a data merging relationship with a first storage position of the first storage file, and determine a second storage file located at the second storage position in the (i+1)-th layer, where i is an integer

S102

Based on a data comparison result of first data in the first storage file and second data in the second storage file, determine target write-in data to be written into a third storage file corresponding to the second storage file, and write the target write-in data into the third storage file

S103

Determine a target storage virtual file corresponding to the second storage file, and establish index information corresponding to the third storage file in the target storage virtual file, so as to establish an association relationship between the target storage virtual file and the third storage file; where index information stored in the target storage virtual file is used for querying data stored in storage files associated with the target storage virtual file, and the index information stored in the target storage file comprises index information corresponding to the second storage file

(56)                    References Cited

U.S. PATENT DOCUMENTS

| 2022/0156231 A1 | 5/2022 | Wang et al. |
| 2022/0382760 A1 | 12/2022 | Pang et al. |

FOREIGN PATENT DOCUMENTS

| CN | 113326262 A | 8/2021 |
| CN | 114416646 A | 4/2022 |
| CN | 114780500 A | 7/2022 |
| CN | 116450591 A | 7/2023 |
| KR | 20190100537 A | 8/2019 |

* cited by examiner

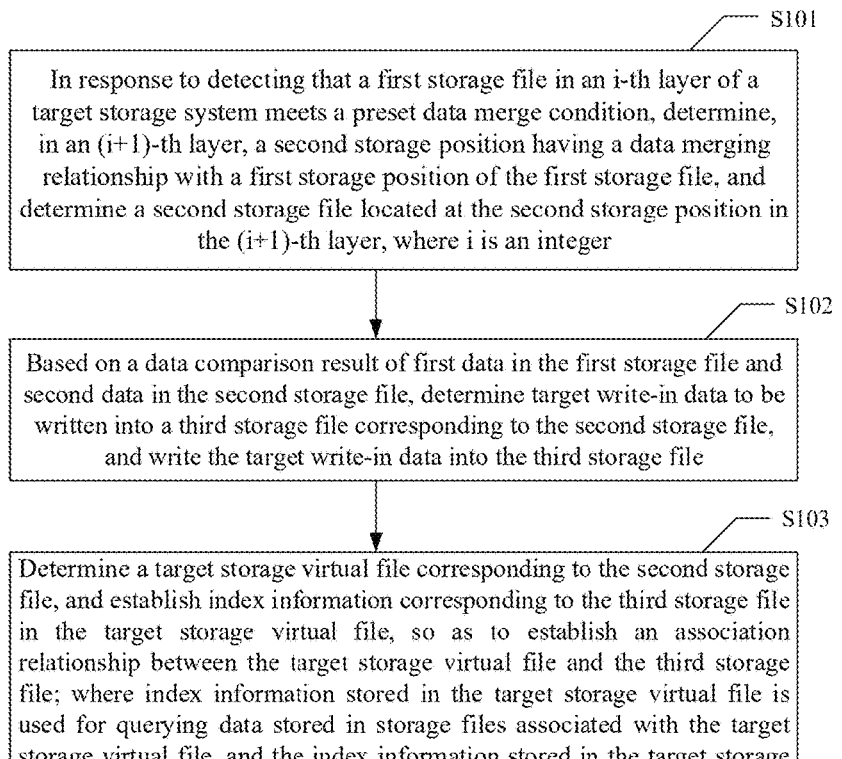

S101

In response to detecting that a first storage file in an i-th layer of a target storage system meets a preset data merge condition, determine, in an (i+1)-th layer, a second storage position having a data merging relationship with a first storage position of the first storage file, and determine a second storage file located at the second storage position in the (i+1)-th layer, where i is an integer

S102

Based on a data comparison result of first data in the first storage file and second data in the second storage file, determine target write-in data to be written into a third storage file corresponding to the second storage file, and write the target write-in data into the third storage file

S103

Determine a target storage virtual file corresponding to the second storage file, and establish index information corresponding to the third storage file in the target storage virtual file, so as to establish an association relationship between the target storage virtual file and the third storage file; where index information stored in the target storage virtual file is used for querying data stored in storage files associated with the target storage virtual file, and the index information stored in the target storage file comprises index information corresponding to the second storage file

FIG. 1

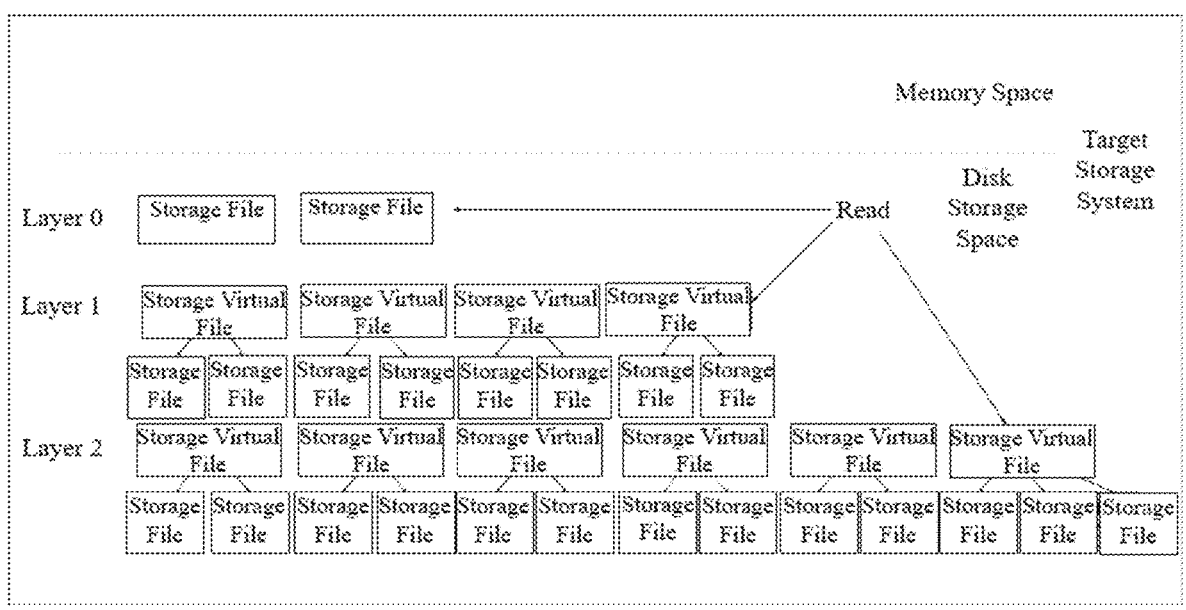

FIG. 2

DATA PROCESSING METHOD, COMPUTER DEVICE, AND STORAGE MEDIUM

CROSS REFERENCE TO THE RELATED APPLICATIONS

This application is the national phase entry of International Application No. PCT/CN2024/096530, filed on May 31, 2024, which is based upon and claims priority to Chinese Patent Application No. 202310708563.5, filed on Jun. 15, 2023, the entire contents of which are incorporated herein by reference.

TECHNICAL FIELD

The present disclosure relates to the field of computer technologies, and in particular, to a data processing method, a computer device, and a storage medium.

BACKGROUND

Log-structured merge-tree (LSM-Tree) is a multi-level tree data structure widely used in the field of data storage. In a data storage system with the LSM-Tree structure, data will be cached in a memory space first. When the memory space reaches a certain threshold, the data in the memory will be written into a disk space in batches. The disk space is composed of multiple layers of tree-shaped storage components, and each layer of the storage components corresponds to a threshold value of a size of stored data, respectively, and the threshold values increase exponentially from top to bottom. The data written from the memory to the disk space will be first stored in the upper-layer storage component. When the data stored in the upper-layer storage component reaches the threshold, the data of the layer will be merged into the lower-layer storage component through a data merging operation.

Specifically, during the data merging operation, a portion of data from the upper-layer and lower-layer storage components to be merged needs to be read respectively to the memory for merging, and a result is written back to the lower storage component after the merging, while only the data of the upper-layer storage component is valid moved data, and the data of the lower-layer storage component is not moved. But the data of the lower-layer storage component still needs to be repeatedly written into the lower-layer storage component, so a problem of write amplification is caused, the performance of the storage device in the data storage system is seriously degraded, and the service life is shortened. Therefore, the problem of write amplification becomes an urgent problem to be solved in the field.

SUMMARY

The examples of the present disclosure at least provide a data processing method, a computer device and a storage medium.

In a first aspect, an example of the present disclosure provides a data processing method, including:

in response to detecting that a first storage file in an i-th layer of a target storage system meets a preset data merging condition, determining, in an (i+1)-th layer, a second storage position having a data merging relationship with a first storage position of the first storage file, and determining a second storage file located at the second storage position in the (i+1)-th layer, wherein i is an integer;

determining target write-in data to be written into a third storage file corresponding to the second storage file based on a data comparison result of first data in the first storage file and second data in the second storage file, and writing the target write-in data into the third storage file;

determining a target storage virtual file corresponding to the second storage file, and establishing, in the target storage virtual file, index information corresponding to the third storage file, so as to establish an association relationship between the target storage virtual file and the third storage file; wherein index information stored in the target storage virtual file is used for querying data stored in storage files associated with the target storage virtual file, and the index information stored in the target storage virtual file includes index information corresponding to the second storage file.

In a second aspect, an example of the present disclosure further provides a computer device, including one or more processors, one or more memories, and a bus, where the memories store machine-readable instructions executable by the processors, the processors communicate with the memories through the bus when the computer device is running, and the machine-readable instructions when executed by the processors, cause the processors to perform steps according to the first aspect or any possible example of the first aspect.

In a third aspect, an example of the present disclosure further provides a non-transitory computer readable storage medium, on which a computer program is stored, and the computer program is executed by a processor to perform steps of the first aspect or any possible example of the first aspect.

the present disclosure provides a data processing method, a computer device, and a storage medium. When it is detected that the first storage file in the i-th layer in the target storage system meets the preset data merging condition, a data comparison is performed for the first storage file and a second storage file that require a data merging operation, and based on a result of the data comparison, target write-in data to be written into a third storage file corresponding to the second storage file is determined. In this way, the second storage file and the third storage file may form a full amount of data after data merging, while the data is required to be written into only the third storage file. Therefore, generating the target write-in data using the data comparison result of the first storage file and the second storage file requires less data to be rewritten compared to generating the write-in data by reorganizing the data of the first storage file and the second storage file, and there is no need to rewrite the full amount of data of the first storage file and the second storage file. On the other hand, after the target write-in data to be written into the third storage file is determined, a target storage virtual file corresponding to the second storage file is determined, and index information corresponding to the third storage file is established in the target storage virtual file, so that based on the index information stored in the target storage virtual file, data stored in a storage file corresponding to the index information stored in the target storage virtual file may be queried In this way, the data written in the third storage file may be normally used according to the index information corresponding to the third storage file stored in the target storage virtual file, so that the amount of data writes may be reduced on the premise of ensuring the normal use of data in the storage system.

In order to make the foregoing purposes, features, and advantages of the present disclosure more easily understood, a detailed description of the preferred examples is set forth in the following in conjunction with accompanying drawings.

BRIEF DESCRIPTION OF DRAWINGS

In order to illustrate technical solutions of examples of the present disclosure more clearly, the accompanying drawings used in the examples are briefly described in the following. The accompanying drawings herein are incorporated in and constitute a part of the specification, illustrate embodiments consistent with the present disclosure, and are used together with the specification to illustrate the technical solutions of the present disclosure. It should be understood that the following accompanying drawings only illustrate certain examples of the present disclosure and are therefore not to be considered as limiting the scope. Those skilled in the art may derive other related accompanying drawings from these accompanying drawings without creative work.

FIG. 1 is a flowchart illustrating a data processing method according to an example of the present disclosure.

FIG. 2 is a schematic diagram illustrating relationships between storage virtual files and storage files in a target storage system in a data processing method according to an example of the present disclosure.

DETAILED DESCRIPTION OF THE EMBODIMENTS

Figure 3:
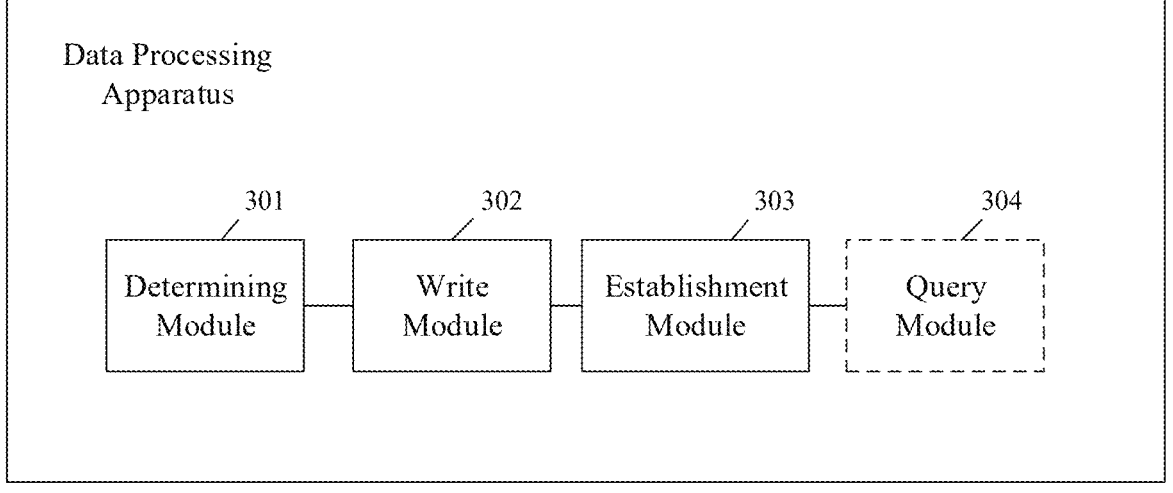
FIG. 3 is a schematic architecture diagram of a data processing apparatus according to an example of the present disclosure.

In order to clarify the purpose, technical solutions and advantages of the examples of the present disclosure, the technical solutions in the examples of the present disclosure will be clearly and completely described in the following in conjunction with the accompanying drawings in the examples of the present disclosure. It is clear that the described examples are only a part of the examples of the present disclosure, but not all of examples. The components of the examples of the present disclosure generally described and illustrated in the accompanying drawings herein may be arranged and designed in a variety of different configurations. Accordingly, the following detailed description of the examples of the disclosure provided in the accompanying drawings is not intended to limit the scope of the disclosure, but rather represents only selected examples of the present disclosure. Based on the examples of the present disclosure, all other examples obtained by those skilled in the art without creative work fall within the scope of the present disclosure.

It should be noted that like numerals and letters refer to like items in the following drawings. Therefore, once an item is defined in a drawing, it need not be further defined and explained in subsequent drawings.

The term "and/or" herein merely describes an association relationship, indicating that there may be three kinds of relationships. For example, A and/or B may indicate that A exists alone, A and B exist at the same time, and B exists alone. Additionally, that term "at least one" as used herein mean any one of a plurality or any combination of at least two of a plurality. For example, including at least one of A, B, and C may represent including any one or more elements selected from the set consisting of A, B, and C.

It is found after research that in a data storage system with the log-structured merge-tree (LSM-Tree) structure, data will be cached in a memory space first. When the memory space reaches a certain threshold, the data in the memory will be written into a disk space in batches. The disk space is composed of multiple layers of tree-structured storage components, and each layer of the storage components corresponds to a threshold value of a size of storage data, respectively, and the threshold values increase exponentially from top to bottom. The data written from the memory to the disk space will be first stored in the upper-layer storage component. When the data stored in the upper-layer storage component reaches the threshold, the data of the layer will be merged into the lower-layer storage component through a data merging operation.

Specifically, during the data merging operation, a portion of data from the upper-layer and lower-layer storage components to be merged needs to be read respectively into the memory for merging, and a result is written back into the lower-layer storage component after the merging. While only the data of the upper-layer storage component is valid moved data, and the data of the lower-layer storage component is not moved, but the data of the lower-layer storage component still needs to be repeatedly written into the lower-layer storage component, therefore, a problem of write amplification is caused.

In the related art, in order to solve the problem of write amplification, the following solutions are adopted, but the following solutions still have corresponding defects.

In solution 1, the file size limit is increased and the number of layers of data is reduced.

In this solution, the reduction of write amplification is limited, and under certain query conditions (such as requiring data to be in order), the query cost will increase.

In solution 2, hot and cold keys are separated to reduce frequent rewriting of the hot keys.

In this solution, the cost of data storage will be increased, and due to the addition of asynchronous data processing logic for hot and cold key differentiation, the cost of data writing and data query will also be increased.

In solution 3, keys and values are separated, where the query keywords 'key' and the query contents 'value' are stored separately.

In this solution, although the problem of write amplification can be solved to some extent, it also brings some other problems, such as increasing read amplification.

Based on the above research, the present disclosure provides a data processing method and apparatus, a computer device, and a storage medium. When it is detected that a first storage file in an i-th layer in a target storage system meets a preset data merging condition, a data comparison is performed for the first storage file and a second storage file that require a data merging operation, and based on a result of the data comparison, target write-in data to be written into a third storage file corresponding to the second storage file is determined. In this way, the second storage file and the third storage file may form a full amount of data after data merging, but what needs to be written is only the data in the third storage file. Therefore, generating the target write-in data using the data comparison result of the first storage file and the second storage file requires less data to be rewritten compared to generating the write-in data by reorganizing the data of the first storage file and the second storage file, and there is no need to rewrite the full amount of data of the first storage file and the second storage file. On the other hand, after the target write-in data to be written into the third storage file is determined, a target storage virtual file corresponding to the second storage file is determined, and index information corresponding to the third storage file is established in the target storage virtual file, so that based on the index information stored in the target storage virtual file, data stored in a storage file corresponding to the index information stored in the target storage virtual file may be queried. In this way, the data written in the third storage file may be normally used according to the index information corresponding to the third storage file stored in the target storage virtual file, so that the amount of data writes may be reduced on the premise of ensuring the normal use of data in the storage system.

In order to facilitate the understanding of the example, the data processing method disclosed in the example is first introduced in detail, and the executing subject of the data processing method provided in the example of the present disclosure is generally a computer device with certain computing capability, and the computer device includes, for example, a terminal device or a server or other processing devices. The terminal device may be a User Equipment (UE), a mobile device, a user terminal, a terminal, a Personal Digital Assistant (PDA), a handheld device, a computing device, an in-vehicle device, or a wearable device, etc. In some possible implementations, the data processing method may be implemented by a processor invoking computer-readable instructions stored in a memory.

FIG. 1 is a flowchart illustrating a data processing method according to an example of the present disclosure. The method includes S101 to S103 as follows.

In S101, when it is detected that a first storage file in an i-th layer of a target storage system meets a preset data merging condition, a second storage position having a data merging relationship with a first storage position of the first storage file is determined in an (i+1)-th layer, and a second storage file located at the second storage position in the (i+1)-th layer is determined, where i is an integer.

In S102, based on a data comparison result of first data in the first storage file and second data in the second storage file, target write-in data to be written into a third storage file corresponding to the second storage file is determined and the target write-in data is written into the third storage file.

In S103, a target storage virtual file corresponding to the second storage file is determined, and index information corresponding to the third storage file is established in the target storage virtual file, to establish an association relationship between the target storage virtual file and the third storage file; where index information stored in the target storage virtual file is used for querying data stored in storage files associated with the target storage virtual file, and the index information stored in the target storage virtual file includes index information corresponding to the second storage file.

The following is a detailed description of the above steps.

For S101, the target storage system may be a storage system that adopts a data structure with multi-layer attribute for data storage, for example, a storage system that adopts an LSM-Tree structure for data storage. And the target storage system may include at least one persistence device for data storage. The persistence device may include a mechanical hard disk (Hard Disk Drive, HDD), a solid state disk (SSD), etc. The data merging condition corresponding to the first storage file in the i-th layer may be that an amount of data required to be stored of the first storage file is greater than a preset data amount threshold.

Specifically, when determining, in the (i+1)-th layer, the second storage position having a data merging relationship with the first storage position of the first storage file, a data merging relationship between a storage position corresponding to a storage file in the i-th layer and a storage position corresponding to a storage file in the (i+1)-th layer may be preset. The second storage position having a data merging relationship with the first storage position is determined from a storage space corresponding to the (i+1)-th layer. And when determining the second storage file located at the second storage position of the (i+1)-th layer, a storage file including the data at the second storage position may be taken as the second storage file located at the second storage position of the (i+1)-th layer.

For example, the data merging relationship between the storage position corresponding to a storage file in the i-th layer and the storage position corresponding to a storage file in the (i+1)-th layer may include a data merging relationship which exists between the m-th storage position in the first layer and the n-th storage position in the second layer, where m and n may be preset positive integers.

It should be noted that, a layer sequence number of each layer of storage files in the target storage system may be set to any integer value, for example, the target storage system may include four layers of storage files in total from layer 0 to layer 3. The number of layers of the storage files included in the target storage system may be set according to at least one of parameters such as the number of persistence devices included in the target storage system, the size of the storage space, a read-write speed, and an estimated value of a write-in data amount, etc.

For S102, here, the first data represents data stored in the first storage file; the second data represents data stored in the second storage file; and the third storage file may be located in a same layer of the target storage system as the second storage file.

In a possible example, when determining the target write-in data to be written into the third storage file corresponding to the second storage file, the following steps A1-A2 may be performed.

In A1, the first data in the first storage file is compared with the second data in the second storage file, and under a condition that query keywords of the first data are not completely the same as those of the second data, first target data that only exists in the first data is determined among the first data and the second data; and second target data that only exists in the second data is determined among the first data and the second data.

When comparing the first data in the first storage file and the second data in the second storage file, query keywords in key-value pairs corresponding to the first data may be used to compare with query keywords in key-value pairs corresponding to the second data. The corresponding relationship between a query keyword and data may be represented by a key-value pair, for example, by a key-value pair "key-value".

For example, if the query keywords in the key-value pairs corresponding to the first data are A, B, and C, and the query keywords in the key-value pairs corresponding to the second data are D and E, among the first data and the second data, the first target data that only exists in the first data are A, B, and C; and the second target data that exists only in the second data are D and E.

In A2, the first target data and position information corresponding to the second target data are taken as target write-in data to be written into the third storage file corresponding to the second storage file, where the position information corresponding to the second target data is used for generating a first local index corresponding to the second target data.

Here, the position information corresponding to the second target data may be used as the target write-in data, and besides, other attribute information other than the position information corresponding to the second target data may also be used as the target write-in data, where the other attribute information may include an adding time and the like.

Following the above example, after the first target data and the second target data are determined, data respectively corresponding to the first target data A, B, and C, and position information respectively corresponding to the second target data D and E, may be used as the target write-in data to be written into the third storage file corresponding to the second storage file.

In this way, by using the first target data as the target write-in data to be written into the third storage file corresponding to the second storage file, when performing data update, there is no need to rewrite data that originally exists in the second storage file, instead, incremental data that needs to be updated (that is, the first target data that only exists in the first data) is written into the third storage file corresponding to the second storage file. Compared with rewriting the incremental data and the data in the second storage file into the second storage file, the amount of data writes may be effectively reduced.

On the other hand, by using the attribute information, such as the position information corresponding to the second target data, as the target write-in data to be written into the third storage file corresponding to the second storage file, a quick query for the second target data may be performed based on the local index generated by the position information corresponding to the second target data, and the second target data in the second storage file may be managed based on the attribute information.

In practical applications, when performing data merging, in addition to the above situation of the incremental data update, a situation of updating original data with update data may also be included in the data merging. For example, the key-value pairs corresponding to the first data and the key-value pairs corresponding to the second data both include the query keyword A, that is, at this time, the data corresponding to the query keyword A needs to be updated.

Further, the second storage file may also be updated through the following steps C1-C2.

In C1, a data combination corresponding to a same query keyword in the first data and the second data are determined, where the data combination includes update data in the first data and data to be updated in the second data.

For example, if the query keywords in the key-value pairs corresponding to the first data are A, B, and C, and the query keywords in the key-value pairs corresponding to the second data are A, D, and E, the query keyword A is the same query keyword. At this time, it may be determined that data corresponding to the query keyword A in the first data is the update data, and data corresponding to the query keyword A in the second data is the data to be updated.

In C2, for a data combination corresponding to any same query keyword, the data to be updated in the second data is updated based on the update data in the data combination, to obtain an updated second storage file.

Here, in a case that there are a plurality of same query keywords, for a data combination corresponding to any one of the same query keywords, the data to be updated in the second data may be updated based on the update data in the data combination, to obtain the updated second storage file.

Following the above example, the data to be updated corresponding to the query keyword A in the second data may be updated by using the update data corresponding to the query keyword A in the first data, so as to update the data corresponding to the query keyword A in the second storage file.

In a possible example, when updating the data to be updated in the second data to obtain the updated second storage file, the update data in the data combination and other data except the data to be updated in the second data may be reorganized, and the reorganized data obtained after the reorganization is written into the second storage file, so as to update the data to be updated in the second storage file, to obtain the updated second storage file.

When reorganizing the update data in the data combination and other data except the data to be updated in the second data, and writing the reorganized data obtained after the reorganization into the second storage file, the update data in the data combination and other data except the data to be updated in the second data may be sorted, and the sorted data obtained after the sorting processing may be written into the second storage file in sequence so as to update the data to be updated in the second storage file and obtain the updated second storage file.

In this way, although the update data is still used to perform data rewriting operations such as reorganization processing and data writing, etc. on the data in the second storage file, a key-value pair is used as a judgment granularity when determining whether data rewriting is required to be performed during data merging, and the corresponding data rewriting operations are performed on the data in second storage file only when the update data exists. Compared with directly using all the first data as the data used for data rewriting to perform rewriting operations on the data in the second storage file no matter whether the data in the second storage file is to be updated or not, by setting a more appropriate judgment granularity, the problem of an excessive amount of data writes due to frequent data rewriting of the second storage file may be reduced.

In another possible implementation, the local index corresponding to the update data may also be stored through the following steps D1-D2, so as to perform data query on the update data based on the local index.

In D1, update data in the first data which corresponds to a same query keyword as the data in the second data is determined, and the update data is written into a storage file associated with the target storage virtual file.

Here, the storage file which the data is written to and associated with the target storage virtual file may be a storage file with a smallest amount of storage data among the storage files associated with the target storage virtual file, and due to that the amount of storage data is the smallest, an amount of data to be rewritten during data writing is correspondingly small; or a fourth storage file may be created, and the update data may be written into the fourth storage file, and an association relationship between the fourth storage file and the target storage virtual file may be established, so that the update data may be queried through the target storage virtual file.

The target storage virtual file will be described in detail in the following and will not be described here.

In D2, a second local index corresponding to the update data is established in the target storage virtual file, to perform data query from the update data through the second local index.

Where the second local index is used to quickly retrieve the update data from the storage file associated with the target storage virtual file.

In this way, there is no need for the data in the second storage file to be directly updated by using the update data. The update data may be found by using the second local index during subsequent data query in a manner that the second local index corresponding to the update data exists, so that the problem of write amplification caused by data rewriting of the second storage file may be avoided.

For S103, here, the target storage virtual file corresponding to the second storage file is used to query the data in the associated storage files including the second storage file. A storage virtual file may be associated with a plurality of storage files, and any storage virtual file may be used for query and management of the storage files associated with the storage virtual file. The association relationship between a storage virtual file and a storage file may also be represented by an index mapping relationship between the storage virtual file and the storage file. When adding index information corresponding to any storage file to a storage virtual file, an index mapping relationship between the storage file and the storage virtual file may be established in the storage virtual file, so that the storage file may be quickly located according to the established index mapping relationship based on the storage virtual file. The index information may include a global index representing a position of the storage file in the target storage system, and a local index representing the position of each data in the storage file. The index information may be a hash index. And when creating the index information, the index information may be established according to a preset hash index establishment method.

For example, a schematic diagram of relationships between the storage virtual files and the storage files in the target storage system may be as shown in FIG. 2. In FIG. 2, the disk storage space of the target storage system includes three layers of storage files, where layer 0 includes two storage files, layer 1 includes four storage virtual files, and each storage virtual file is associated with two storage files. When reading data in any storage file in the layer 1, query may be performed through a storage virtual file associated with the storage file. Layer 2 includes six storage virtual files, and each storage virtual file is associated with two or three storage files; when reading data in any storage file in the layer 2, query may be performed through a storage virtual file associated with the storage file.

In practical applications, when the number of storage files associated with a storage virtual file is too large, problems such as a slow query speed and the like may occur, therefore, an upper limit may be set for the number of storage files that can be associated with a storage virtual file, so as to avoid various possible problems caused by a storage virtual file being associated with too many storage files.

In a possible example, before the index information corresponding to the third storage file is stored in the target storage virtual file, the target index information stored in the target storage virtual file may be deleted through the following steps E1-E3.

In E1, a number of storage files associated with the target storage virtual file is determined.

In E2, in a case of detecting that the number of the files is greater than a preset number, the target index information stored in the target storage virtual file of which the adding time meets a preset adding time requirement is determined.

Here, the preset number may be, for example, 5, and the preset adding time requirement may be an earliest adding time.

In a possible example, in order to quickly determine the target index information with the earliest adding time, when storing the index information in the target storage virtual file, the index information that needs to be stored may be stored in a preset queue, and a maximum queue length corresponding to the preset queue is the preset number. In this way, each time index information corresponding to any storage file is added, the index information corresponding to the storage file may be added to the end of the preset queue, and the index information at the head of the preset queue is the target index information with the earliest adding time.

For example, if the preset number is 5, the maximum queue length of the preset queue corresponding to the target storage virtual file is 5, and when sequentially storing the index information respectively corresponding to the storage files 1 to 5 to the preset queue, the index information corresponding to the storage file 1 which is earliest added to the preset queue is located at the head of the queue (also called the head of the queue). The index information corresponding to the storage file 5 which is last added to the preset queue is located at the end of the queue. When index information corresponding to a storage file 6 is newly added, it may be determined that the target index information which is earliest added to the preset queue is the index information corresponding to the storage file 1.

In E3, data merging processing is performed on the data in the target storage file corresponding to the target index information and other storage files except the target storage file, and the target index information stored in the target storage virtual file is deleted.

Here, when performing data merging on the data in the target storage file corresponding to the target index information and other storage files except the target storage file, because the other storage files may include position information corresponding to the target storage file (referring to related contents of A1 and A2 above), it is possible to determine valid data that only exists in the target storage file, and store the determined valid data to the other storage files.

Specifically, when storing the valid data to the other storage files, the valid data may be stored in a storage file with the smallest data amount of corresponding storage data among the other storage files, and because the data amount of the storage data is the smallest, the amount of data that needs to be rewritten during data writing is correspondingly small.

Specifically, when deleting the target index information stored in the target storage virtual file, a queue head deletion mechanism may be used to delete the target index information that is earliest added to the preset queue corresponding to the target storage virtual file.

In a possible example, when determining the target storage virtual file corresponding to the second storage file, any of the following manners may be used.

In manner 1, a storage virtual file storing index information corresponding to the second storage file is used as the target storage virtual file.

Here, in order to facilitate subsequent data query and management through storage virtual files, when constructing the data architecture in the target storage system, virtual files may be configured correspondingly for each layer of storage files in advance, and index information corresponding to the storage files may be stored in the corresponding storage virtual files. Therefore, if any storage virtual file stores the index information corresponding to the second storage file, the storage virtual file is the target storage virtual file associated with the second storage file.

In manner 2, in a case where there is no available storage virtual file for storing the index information corresponding to the second storage file, a target storage virtual file corresponding to the second storage file is created.

Here, the storage virtual file may also be created when specifically being used, that is, the data architecture in the target storage system does not include storage virtual files when the data architecture is created; and when an operation such as writing data to a storage file is required, a corresponding storage virtual file is created for the storage file that requires the related operation, and index information of the storage file associated with the created storage virtual file is stored into the created storage virtual file.

Therefore, in a case where there is no available storage virtual file for storing the index information corresponding to the second storage file, a target storage virtual file corresponding to the second storage file may be created, and the created target storage virtual file may be determined as the target storage virtual file that corresponds to the determined second storage file.

Further, after the target storage virtual file corresponding to the second storage file is created, index information corresponding to the second storage file may further be stored in the target storage virtual file, to establish an association relationship between the target storage virtual file and the second storage file.

In a possible example, when establishing index information corresponding to the third storage file in the target storage virtual file, the index information corresponding to the third storage file may be established in the target storage virtual file.

The index information corresponding to the third storage file may include a global index representing a position of the storage file in the target storage system and a third local index representing the position of each data in the third storage file.

In a possible example, data query may be performed according to the following steps F1-F3.

In F1, according to a received data query request, a query keyword corresponding to the data query request is determined.

In F2, according to the query keyword, a target query virtual file including a global index corresponding to the query keyword is determined from a plurality of storage virtual files and a storage file to be queried in the target query virtual file is determined.

Here, when determining the target query virtual file including the global index corresponding to the query keyword from the plurality of storage virtual files according to the query keyword, the global index corresponding to the query keyword may be acquired according to the query keyword, and the storage virtual file including the global index may be used as the target query virtual file.

Specifically, when determining the storage file to be queried in the target query virtual file, the storage file to be queried that matches the query keyword among each of the query files associated with the target query virtual file may be determined according to the mapping relationship between the query keyword and the storage file.

In F3, query content matched with the query keyword is acquired from the storage file to be queried.

Here, because the local index includes a specific position of the query content matched with the query keyword in the storage file, the storage file to be queried may be determined according to the query keyword, and the query content matched with the query keyword is acquired from the storage file to be queried according to the local index matched with the query keyword and stored in the target query virtual file.

In addition, when acquiring the query content matched with the query keyword from the storage file to be queried, the query content matched with the query keyword may be acquired by querying the storage file to be queried using a binary search method.

In this way, quick data query may be performed in the target storage system including storage virtual files based on the query keyword. And while performing the data query, taking data of query content that is located in the second storage file as an example, due to that the index information corresponding to the second storage file is stored in the target query virtual file, compared with a data storage system that does not include a virtual file, a data storage system that includes a target query virtual file may query data in the second storage file associated with the target query virtual file through index information included in the target query virtual file.

In practical applications, in addition to supporting data query using query keywords, the data storage system may also perform range query, which requires an iterator to perform sequential range query on data in storage files.

In a possible example, the range query may be performed according to the following steps G1-G3.

In G1, according to a received range query request, at least one storage virtual file corresponding to the range query request is determined.

In G2, under a condition that the at least one storage virtual file is associated with a plurality of storage files, merge sort may be performed on the iterators respectively corresponding to the plurality of storage files to obtain a target iterator corresponding to the at least one storage virtual file.

Here, due to that there are a plurality of storage files associated with the storage virtual file, each of the storage files corresponds to an iterator, to ensure the accuracy of a query result of the sequential range query performed on the plurality of storage files associated with the storage virtual file, the iterators respectively corresponding to the plurality of stored files may be performed with merge sort to obtain a target iterator corresponding to the at least one storage virtual file.

In G3, storage files associated with the at least one storage virtual file are traversed based on the target iterator, and a query result corresponding to the range query request is determined.

Here, because the iterator merge sort processing mechanism is set for the storage virtual file, the iterators corresponding to each of the storage files associated with the storage virtual file can be merged into a target iterator, so that a global sequential range scanning may be implemented when range query is performed on the storage files corresponding to the storage virtual file, thereby facilitating quick data range query in a data storage system with ordered storage.

In a possible example, the target storage system may set different data storage formats for different types of query requests to improve the response performance of the query requests in a targeted manner.

For a data query request with a corresponding query keyword, the data query request may be quickly responded through the above F1-F3 and a data query result is quickly obtained. For a large-range sequential data query request, the data storage format in the target storage system may be set as ordered storage, and the large-range sequential data query request may be quickly responded through the above G1-G3 and a data range query result is quickly obtained.

In the following, the data merging operation provided in the example of the present disclosure is introduced, and the data merging operation may include the following steps.

In step 1, in response to detecting that a first storage file in an i-th layer of a target storage system meets a preset data merging condition, a second storage position having a data merging relationship with a first storage position of the first storage file is determined in an (i+1)-th layer, and a second storage file in the (i+1)-th layer located at the second storage position is determined, where i is an integer.

In step 2, index information in a target storage virtual file corresponding to the second storage file is updated.

Here, updating the index information in the target storage virtual file includes generating a global index according to full amount of data included in the first storage file and the second storage file, so as to retrieve storage files including the full amount of data through the global index, as the target storage virtual file corresponding to the second storage file, and query data in the full amount of data through the target storage virtual file.

In step 3, it is determined whether a data update is required based on a data comparison result of first data in the first storage file and second data in the second storage file, and target write-in data to be written into a third storage file corresponding to the second storage file is determined.

Here, when determining whether a data update is required, it may be determined according to whether there is data in the first data and the second data that corresponds to a same query keyword. The specific determination process may refer to the aforementioned relevant contents of the update data and the data to be updated, which will not be repeatedly described here. If the data update is required, step 4 to step 5 are performed; if the data update is not required, step 5 is performed.

In step 4, data in the second storage file is updated.

Here, the specific updating method for updating the data in the second storage file may refer to the above related contents, and will not be not repeatedly described here.

Specifically, after the data in the second storage file is updated, a file sequence number corresponding to the second storage file in the target storage virtual file may also be updated, so as to update the file sequence number corresponding to the second storage file to a preset position (such as a head position). In this way, when subsequently merging the storage files associated with the target storage virtual file and creating a new storage file, a deletion order corresponding to the updated second storage file may be deferred. The description related to the deletion may refer to related contents of the above E1-E3, which is not repeated here.

In step 5, index information in the target storage virtual file is updated.

Here, the index information in the target storage virtual file is updated, so that the index information of each storage file associated with the target storage virtual file is stored in the target storage virtual file, thereby facilitating performing data query on each storage file.

Specifically, for the description content of updating the index information in the target storage virtual file, reference may be made to the related content of establishing the index information corresponding to the third storage file in the target storage virtual file in S103 above, which is not repeated here.

According to the data processing method provided in the example of the present disclosure, when it is detected that the first storage file in the i-th layer in the target storage system meets the preset data merging condition, the first storage file and the second storage file that require data merging operation are compared, and target write-in data to be written into the third storage file corresponding to the second storage file is determined based on the data comparison result. In this way, the second storage file and the third storage file may form the full amount of data after data merging, but what needs to be written is only the data in the third storage file. Therefore, generating the target write-in data using the data comparison result of the first storage file and the second file requires less data to be rewritten compared to generating the write-in data by reorganizing the data of the first storage file and the second storage file, and there is no need to rewrite the full amount of data of the first storage file and the second storage file. On the other hand, after the target write-in data to be written into the third storage file is determined, the target storage virtual file corresponding to the second storage file is determined, and the index information corresponding to the third storage file is established in the target storage virtual file, so that based on the index information stored in the target storage virtual file, data stored in a storage file whose index information is stored in the target storage virtual file may be queried. In this way, the data written in the third storage file may be normally used according to the index information corresponding to the third storage file stored in the target storage virtual file, so that the amount of data writes may be reduced on the premise of ensuring the normal use of data in the storage system.

Those skilled in the art are able to understand that in the above method of the detailed description, the writing order of each step does not mean a strict execution order that constitutes any limitation on the implementation process. The specific execution order of each step should be determined according to its function and a possible internal logic.

Based on a same inventive concept, an example of the present disclosure further provides a data processing apparatus corresponding to the data processing method. Due to that the principle of solving problems by the apparatus in the example of the present disclosure is similar to that of the above data processing method in the embodiment, reference may be made to the implementation of the method for the implementation of the apparatus, and the repetition is omitted.

FIG. 3 is a schematic architecture diagram illustrating a data processing apparatus according to an example of the present disclosure. The apparatus includes a determining module 301, a write module 302, and an establishment module 303.

The determining module 301 is configured to, in response to detecting that a first storage file in an i-th layer of a target storage system meets a preset data merging condition, determine, in an (i+1)-th layer, a second storage position having a data merging relationship with a first storage position of the first storage file, and determine a second storage file located at the second storage position in the (i+1)-th layer, wherein i is an integer.

The write module 302 is configured to determine target write-in data to be written into a third storage file corresponding to the second storage file based on a data comparison result of first data in the first storage file and second data in the second storage file, and write the target write-in data into the third storage file.

The establishment module 303 is configured to determine a target storage virtual file corresponding to the second storage file, and establish index information corresponding to the third storage file in the target storage virtual file, so as to establish an association relationship between the target storage virtual file and the third storage file; wherein index information stored in the target storage virtual file is used for querying data stored in storage files associated with the target storage virtual file, and the index information stored in the target storage virtual file includes index information corresponding to the second storage file.

In a possible example, when determining the target write-in data to be written into the third storage file corresponding to the second storage file based on the data comparison result of the first data in the first storage file and the second data in the second storage file, the write module 302 is further configured to:

compare the first data in the first storage file and the second data in the second storage file; in response to that query keywords of the first data and query keywords of the second data are not completely same, determine first target data that only exists in the first data among the first data and the second data; and determine second target data that only exists only in the second data among the first data and the second data; and take the first target data and position information corresponding to the second target data as target write-in data to be written into the third storage file corresponding to the second storage file, wherein the position information corresponding to the second target data is used for generating a first local index corresponding to the second target data.

In a possible example, the write module 302 is further configured to:

determine a data combination corresponding to each same query keyword in the first data and the second data, wherein the data combination includes update data in the first data and data to be updated in the second data;

for the data combination corresponding to any one of the same query keywords, update the data to be updated in the second data based on the update data in the data combination to obtain an updated second storage file.

In a possible example, when updating the data to be updated in the second data based on the update data in the data combination to obtain the updated second storage file, the write module 302 is configured to:

reorganize the update data in the data combination and other data in the second data except the data to be updated, and write the reorganized data obtained after the reorganizing into the second storage file so as to update the data to be updated in the second storage file to obtain the updated second storage file.

In a possible example, the establishment module 303 is further configured to:

determine, in the first data, update data which corresponds to a same query keyword as the second data, and writing the update data into a storage file associated with the target storage virtual file;

establish, in the target storage virtual file, a second local index corresponding to the update data so as to perform data query from the update data through the second local index.

In a possible example, before the index information corresponding to the third storage file is stored in the target storage virtual file, the establishment module 303 is further configured to:

determine a number of files associated with the target storage virtual file;

in response to that the number of the files is detected to be greater than a preset number, determine, among the index information stored in the target storage virtual file, target index information of which an adding time meets a preset adding time requirement;

perform data merging on data in a target storage file corresponding to the target index information and other storage files except the target storage file, and delete the target index information stored in the target storage virtual file.

In a possible embodiment, when determining the target storage virtual file corresponding to the second storage file, the establishment module 303 is configured to:

take a storage virtual file that stores index information corresponding to the second storage file as the target storage virtual file, or in response to that there is no available storage virtual file for storing the index information corresponding to second storage files, create a target storage virtual file corresponding to the second storage file;

the establishment module 303 is further configured to:

after creating the target storage virtual file corresponding to the second storage file, store index information corresponding to the second storage file in the target storage virtual file to establish an association relationship between the target storage virtual file and the second storage file.

In a possible example, when establishing, in the target storage virtual file, the index information corresponding to the third storage file, the establishment module 303 is configured to:

establish, in the target storage virtual file, the index information corresponding to the third storage file, wherein the index information includes a global index representing a position of the storage file in the target storage system and a third local index representing a position of each data in the third storage file.

In a possible example, the apparatus further includes a query module 304, which is configured to perform a data query according to the following steps:

determining, according to a received data query request, a query keyword corresponding to the data query request;

determining, according to the query keyword, a target query virtual file including a global index corresponding to the query keyword from a plurality of storage virtual files and determining a storage file to be queried in the target query virtual file;

acquiring query content matched with the query keyword from the storage file to be queried.

In a possible example, the query module 304 is further configured to query the data in the target storage system according to the following steps:

determining, according to a received range query request, at least one storage virtual file corresponding to the range query request;

in response to that the at least one storage virtual file is associated with a plurality of storage files, performing merge sort on iterators respectively corresponding to the plurality of storage files to obtain a target iterator corresponding to the at least one storage virtual file;

traversing the storage files associated with the at least one storage virtual file based on the target iterator to determine a query result corresponding to the range query request.

According to the data processing device provided in the example of the present disclosure, when it is detected that the first storage file in the i-th layer in the target storage system meets the preset data merging condition, a data comparison is performed for the first storage file and a second storage file that require a data merging operation, and based on a result of the data comparison, target write-in data to be written into a third storage file corresponding to the second storage file is determined. In this way, the second storage file and the third storage file may form a full amount of data after data merging, while the data is required to be written into only the third storage file. Therefore, generating the target write-in data using the data comparison result of the first storage file and the second storage file requires less data to be rewritten compared to generating the write-in data by reorganizing the data of the first storage file and the second storage file, and there is no need to rewrite the full amount of data of the first storage file and the second storage file. On the other hand, after the target write-in data to be written into the third storage file is determined, a target storage virtual file corresponding to the second storage file is determined, and index information corresponding to the third storage file is established in the target storage virtual file, so that based on the index information stored in the target storage virtual file, data stored in a storage file corresponding to the index information stored in the target storage virtual file may be queried In this way, the data written in the third storage file may be normally used according to the index information corresponding to the third storage file stored in the target storage virtual file, so that the amount of data writes may be reduced on the premise of ensuring the normal use of data in the storage system.

For the description of the processing flow of each module in the apparatus and the interaction flow between the modules, reference may be made to the relevant description in the above method example, which will not be described in detail here.

Figure 4:
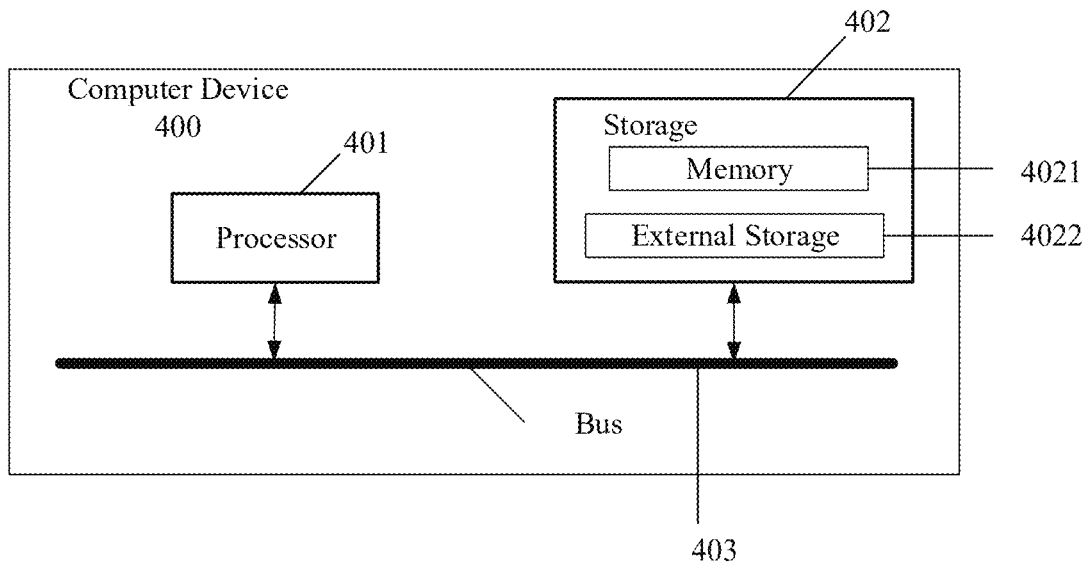
FIG. 4 is a schematic structural diagram of a computer device according to an example of the present disclosure.

Based on the same technical concept, an example of the present disclosure further provides a computer device. FIG. 4 is a schematic structural diagram of a computer device 400 according to an example of the present disclosure. The computer device 400 includes a processor 401, a storage 402, and a bus 403. The storage 402 is configured to store instructions for execution, and includes a memory 4021 and an external storage 4022. Here, the memory 4021 is also called an internal storage, which is used to temporarily store operation data in the processor 401 and data exchanged with the external storage 4022 such as a hard disk, etc. The processor 401 exchanges data with the external storage 4022 through the memory 4021. When the computer device 300 is running, the processor 401 communicates with the storage 402 via the bus 403, so that the processor 401 is executing the following instructions:

in response to detecting that a first storage file in an i-th layer of a target storage system meets a preset data merging condition, determining, in an (i+1)-th layer, a second storage position having a data merging relationship with a first storage position of the first storage file, and determining a second storage file located at the second storage position in the (i+1)-th layer, wherein i is an integer;

determining target write-in data to be written into a third storage file corresponding to the second storage file based on a data comparison result of first data in the first storage file and second data in the second storage file, and writing the target write-in data into the third storage file;

determining a target storage virtual file corresponding to the second storage file, and establishing, in the target storage virtual file, index information corresponding to the third storage file, so as to establish an association relationship between the target storage virtual file and the third storage file; wherein index information stored in the target storage virtual file is used for querying data stored in storage files associated with the target storage virtual file, and the index information stored in the target storage virtual file includes index information corresponding to the second storage file.

In a possible example, among the instructions of the processor 401, determining the target write-in data to be written into the third storage file corresponding to the second storage file based on the data comparison result of the first data in the first storage file and the second data in the second storage file includes:

comparing the first data in the first storage file and the second data in the second storage file; in response to that query keywords of the first data and query keywords of the second data are not completely same, determining first target data that only exists in the first data among the first data and the second data; and determining second target data that only exists only in the second data among the first data and the second data;

taking the first target data and position information corresponding to the second target data as target write-in data to be written into the third storage file corresponding to the second storage file, wherein the position information corresponding to the second target data is used for generating a first local index corresponding to the second target data.

In a possible embodiment, the instructions of the processor 401 further include:

determining a data combination corresponding to each same query keyword in the first data and the second data, wherein the data combination includes update data in the first data and data to be updated in the second data;

for the data combination corresponding to any one of the same query keywords, updating the data to be updated in the second data based on the update data in the data combination to obtain an updated second storage file.

In a possible example, among the instructions of the processor 401, updating the data to be updated in the second data based on the update data in the data combination to obtain the updated second storage file includes:

reorganizing the update data in the data combination and other data in the second data except the data to be updated, and writing the reorganized data obtained after the reorganizing into the second storage file so as to update the data to be updated in the second storage file to obtain the updated second storage file.

In a possible example, the instructions of the processor 401 further include:

determining, in the first data, update data which corresponds to a same query keyword as the second data, and writing the update data into a storage file associated with the target storage virtual file;

establishing, in the target storage virtual file, a second local index corresponding to the update data so as to perform data query from the update data through the second local index.

In a possible example, before storing the index information corresponding to the third storage file to the target storage virtual file, the instructions of the processor 401 further include:

determining the number of files associated with the target storage virtual file;

in response to that the number of the files is detected to be greater than a preset number, determining, among the index information stored in the target storage virtual file, target index information of which an adding time meets a preset adding time requirement;

performing data merging on data in a target storage file corresponding to the target index information and other storage files except the target storage file, and deleting the target index information stored in the target storage virtual file.

In a possible example, among the instructions of the processor 401, determining the target storage virtual file corresponding to the second storage file includes:

taking a storage virtual file that stores index information corresponding to the second storage file as the target storage virtual file, or in response to that there is no available storage virtual file for storing the index information corresponding to the second storage file, creating a target storage virtual file corresponding to the second storage file;

and further includes:

after creating the target storage virtual file corresponding to the second storage file, storing index information corresponding to the second storage file in the target storage virtual file to establish an association relationship between the target storage virtual file and the second storage file.

In a possible example, among the instructions of the processor 401, establishing, in the target storage virtual file, the index information corresponding to the third storage file includes:

establishing the index information corresponding to the third storage file in the target storage virtual file, wherein the index information includes a global index representing a position of the storage file in the target storage system and a third local index representing a position of each data in the third storage file.

In a possible example, the instructions of the processor 401 further include querying data according to the following steps:

determining, according to a received data query request, a query keyword corresponding to the data query request;

determining, according to the query keyword, a target query virtual file including a global index corresponding to the query keyword from a plurality of storage virtual files and determining a storage file to be queried in the target query virtual file;

acquiring query content matched with the query keyword from the storage file to be queried.

In an possible embodiment, the instructions of the processor 401 further include querying data in the target storage system according to the following steps:

determining, according to a received range query request, at least one storage virtual file corresponding to the range query request;

in response to that the at least one storage virtual file is associated with a plurality of storage files, performing merge sort on iterators respectively corresponding to the plurality of storage files to obtain a target iterator corresponding to the at least one storage virtual file;

traversing the storage files associated with the at least one storage virtual file based on the target iterator to determine a query result corresponding to the range query request.

An example of the present disclosure further provides a computer readable storage medium on which a computer program is stored. When the computer program are executed by a processor, steps of the data processing method described in the above method example are performed. The storage medium may be a volatile or non-volatile computer-readable storage medium.

An example of the present disclosure further provides a computer program product carrying program codes, where instructions included in the program codes may be used to execute the steps of the data processing method described in the above method example. For detailed description, reference may be made to the above method example, and details are not repeated here.

The computer program product may be implemented by hardware, software, or a combination thereof. In a possible example, the computer program product is specifically formed as a computer storage medium, and in another possible example, the computer program product is specifically formed as a software product, such as a Software Development Kit (SDK) or the like.

Those skilled in the art may clearly understand that, for the convenience and conciseness of description, the specific working processes of the system and apparatus described above may be referred to the corresponding processes in the above method example, and will not be described here. In the several examples provided in this disclosure, it should be understood that the disclosed system, apparatus, and method may be implemented in other ways. The apparatus example described above is only illustrative, for example, the division of the units is only a division of logical functions, and there may be other division modes in actual implementation, for another example, a plurality of units or components may be combined or integrated into another system, or some features may be omitted or not implemented. On the other hand, the mutual coupling or direct coupling or communication connection displayed or discussed may be indirect coupling or communication connection through some communication interfaces, devices or units, which may be electrical, mechanical or in other forms.

The units described as separate components may or may not be physically separated, and the components shown as units may or may not be physical units, i.e., the components may be located in one place, or they may be distributed over a plurality of network elements. Some or all of the units may be selected according to actual needs to achieve the purpose of the solution of the example.

In addition, each functional unit in each example of the present disclosure may be integrated into one processing unit, or each unit may physically exist separately, or two or more units may be integrated into one unit.

The functionality, when implemented in the form of a software functional unit and sold or used as a stand-alone product, may be stored in a processor-executable, non-volatile, computer-readable storage medium. With this understanding, the technical solution of the present disclosure may be embodied essentially or in part as a contribution to the prior art, or part of the technical solution may be embodied in the form of a software product that is stored in a storage medium including a number of instructions to cause a computer device (which may be a personal computer, a server, or a network device, etc.) to perform all or some of the steps of the method described in the various embodiments of the present disclosure. The storage medium includes a number of instructions to cause a computer device (which may be a personal computer, a server, or a network device, etc.) to perform all or some of the steps of the method described in various embodiments of the present disclosure. The aforementioned storage medium includes a USB flash drive, a removable hard disk, a Read-Only Memory (ROM), a Random Access Memory (RAM), a diskette or a CD-ROM, and other media that can store program code.

Finally, it should be noted that the above examples are only the specific examples of the present disclosure, which are used to illustrate the technical solution of the present disclosure, but are not limitations, and the scope of the present disclosure is not limited to the above examples. Although the present disclosure has been described in detail with reference to the above examples, It should be understood by those of ordinary skill in the art that those of ordinary skill in the art who are familiar with the technology of the present disclosure may still modify or easily conceive of changes to the technical solution described in the foregoing examples within the technical scope of the present disclosure, or make equivalent substitutions to some of the technical features thereof. These modifications, changes or substitutions shall not cause the essence of the corresponding technical solution to deviate from the spirit and scope of the technical solution of the embodiments of the present disclosure, and shall fall within the scope of the present disclosure. Accordingly, the scope of the present disclosure should be based on the scope of the claims.

What is claimed is:

1. A data processing method, comprising:

detecting that a first storage file in an i-th layer of a target storage system meets a preset data merging condition, determining, in an (i+1)-th layer, a second storage position having a data merging relationship with a first storage position of the first storage file, and determining a second storage file located at the second storage position in the (i+1)-th layer, wherein i is an integer;

determining target write-in data to be written into a third storage file corresponding to the second storage file based on a data comparison result of first data in the first storage file and second data in the second storage file, and writing the target write-in data into the third storage file, wherein in response to that query keywords of the first data and query keywords of the second data are not completely same, the target write-in data comprises first target data and position information corresponding to second target data, wherein the first target data is data that only exists in the first storage file among the first storage file and the second storage file, and the second target data is data that only exists in the second storage file among the first storage file and the second storage file; and determining a target storage virtual file corresponding to the second storage file, and establishing, in the target storage virtual file, index information corresponding to the third storage file, so as to establish an association relationship between the target storage virtual file and the third storage file; wherein index information stored in the target storage virtual file is used for querying data stored in storage files associated with the target storage virtual file, and the index information stored in the target storage virtual file comprises index information corresponding to the second storage file.

2. The data processing method according to claim 1, wherein the position information corresponding to the second target data is used for generating a first local index corresponding to the second target data.

3. The data processing method according to claim 2, further comprising:

determining a data combination corresponding to each same query keyword in the first data and the second data, wherein the data combination comprises update data in the first data and data to be updated in the second data; and for the data combination corresponding to any one of the same query keywords, updating the data to be updated in the second data based on the update data in the data combination to obtain an updated second storage file.

4. The data processing method according to claim 3, wherein updating the data to be updated in the second data based on the update data in the data combination to obtain the updated second storage file comprises:

reorganizing the update data in the data combination and other data in the second data except the data to be updated, and writing reorganized data obtained after the reorganizing into the second storage file so as to update the data to be updated in the second storage file, to obtain the updated second storage file.

5. The data processing method according to claim 3, wherein before the index information corresponding to the third storage file is stored in the target storage virtual file, the data processing method further comprises:

determining a number of files associated with the target storage virtual file;

in response to that the number of the files is detected to be greater than a preset number, determining, among the index information stored in the target storage virtual file, target index information of which an adding time meets a preset adding time requirement; and performing data merging on data in a target storage file corresponding to the target index information and other storage files except the target storage file, and deleting the target index information stored in the target storage virtual file.

6. The data processing method according to claim 2, further comprising:

determining, in the first data, update data which corresponds to a same query keyword as the second data, and writing the update data into a storage file associated with the target storage virtual file; and establishing, in the target storage virtual file, a second local index corresponding to the update data so as to perform data query from the update data through the second local index.

7. The data processing method according to claim 1, wherein determining the target storage virtual file corresponding to the second storage file comprises:

taking a storage virtual file that stores index information corresponding to the second storage file, as the target storage virtual file, or in response to that there is no available storage virtual file for storing the index information corresponding to the second storage file, creating a target storage virtual file corresponding to the second storage file; and the data processing method further comprises:

after creating the target storage virtual file corresponding to the second storage file, storing index information corresponding to the second storage file in the target storage virtual file, to establish an association relationship between the target storage virtual file and the second storage file.

8. The data processing method according to claim 1, wherein establishing, in the target storage virtual file, the index information corresponding to the third storage file comprises:

establishing, in the target storage virtual file, the index information corresponding to the third storage file, wherein the index information comprises a global index representing a position of the third storage file in the target storage system and a third local index representing a position of each data in the third storage file.

9. The data processing method according to claim 8, further comprising performing data query by:

determining, according to a received data query request, a query keyword corresponding to the received data query request;

determining, according to the query keyword, a target query virtual file including a global index corresponding to the query keyword from a plurality of storage virtual files and determining a storage file to be queried in the target query virtual file; and acquiring query content matched with the query keyword from the storage file to be queried.

10. The data processing method according to claim 1, further comprising performing data query in the target storage system by:

determining, according to a received range query request, at least one storage virtual file corresponding to the received range query request;

in response to that the at least one storage virtual file is associated with a plurality of storage files, performing merge sort on iterators respectively corresponding to the plurality of storage files to obtain a target iterator corresponding to the at least one storage virtual file; and traversing the storage files associated with the at least one storage virtual file based on the target iterator to determine a query result corresponding to the received range query request.

11. A computer device, comprising: one or more processors, one or more memories, and a bus, wherein the memories store machine-readable instructions executable by the processors, the processors communicate with the memories via the bus when the computer device is running; and the machine-readable instructions, when executed by the processors, cause the processors to perform operations comprising:

in response to detecting that a first storage file in an i-th layer of a target storage system meets a preset data merging condition, determining, in an (i+1)-th layer, a second storage position having a data merging relationship with a first storage position of the first storage file, and determining a second storage file located at the second storage position in the (i+1)-th layer, wherein i is an integer;

determining target write-in data to be written into a third storage file corresponding to the second storage file based on a data comparison result of first data in the first storage file and second data in the second storage file, and writing the target write-in data into the third storage file, wherein in response to that query keywords of the first data and query keywords of the second data are not completely same, the target write-in data comprises first target data and position information corresponding to second target data, wherein the first target data is data that only exists in the first storage file among the first storage file and the second storage file, and the second target data is data that only exists in the second storage file among the first storage file and the second storage file; and determining a target storage virtual file corresponding to the second storage file, and establishing, in the target storage virtual file, index information corresponding to the third storage file, so as to establish an association relationship between the target storage virtual file and the third storage file; wherein index information stored in the target storage virtual file is used for querying data stored in storage files associated with the target storage virtual file, and the index information stored in the target storage virtual file comprises index information corresponding to the second storage file.

12. The computer device according to claim 11, wherein the position information corresponding to the second target data is used for generating a first local index corresponding to the second target data.

13. The computer device according to claim 12, wherein the operations further comprise:

determining a data combination corresponding to each same query keyword in the first data and the second data, wherein the data combination comprises update data in the first data and data to be updated in the second data; and for the data combination corresponding to any one of the same query keywords, updating the data to be updated in the second data based on the update data in the data combination to obtain an updated second storage file.

14. The computer device according to claim 13, wherein updating the data to be updated in the second data based on the update data in the data combination to obtain the updated second storage file comprises:

reorganizing the update data in the data combination and other data in the second data except the data to be updated, and writing the reorganized data obtained after the reorganizing into the second storage file so as to update the data to be updated in the second storage file, to obtain the updated second storage file.

15. The computer device according to claim 13, wherein before the index information corresponding to the third storage file is stored in the target storage virtual file, the operations further comprise:

determining a number of files associated with the target storage virtual file;

in response to that the number of the files is detected to be greater than a preset number, determining, among the index information stored in the target storage virtual file, target index information of which an adding time meets a preset adding time requirement; and performing data merging on data in a target storage file corresponding to the target index information and other storage files except the target storage file, and deleting the target index information stored in the target storage virtual file.

16. The computer device according to claim 12, wherein the operations further comprise:

determining, in the first data, update data which corresponds to a same query keyword as the second data, and writing the update data into a storage file associated with the target storage virtual file; and establishing, in the target storage virtual file, a second local index corresponding to the update data so as to perform data query from the update data through the second local index.

17. The computer device according to claim 11, wherein determining the target storage virtual file corresponding to the second storage file comprises:

taking a storage virtual file that stores index information corresponding to the second storage file, as the target storage virtual file, or in response to that there is no available storage virtual file for storing the index information corresponding to the second storage file, creating a target storage virtual file corresponding to the second storage file; and the operations further comprise:

after creating the target storage virtual file corresponding to the second storage file, storing index information corresponding to the second storage file in the target storage virtual file, to establish an association relationship between the target storage virtual file and the second storage file.

18. The computer device according to claim 11, wherein establishing, in the target storage virtual file, the index information corresponding to the third storage file comprises:

establishing, in the target storage virtual file, the index information corresponding to the third storage file, wherein the index information comprises a global index representing a position of the third storage file in the target storage system and a third local index representing a position of each data in the third storage file.

19. The computer device according to claim 18, wherein the operations further comprise performing data query by:

determining, according to a received data query request, a query keyword corresponding to the received data query request;

determining, according to the query keyword, a target query virtual file including a global index corresponding to the query keyword from a plurality of storage virtual files and determining a storage file to be queried in the target query virtual file; and acquiring query content matched with the query keyword from the storage file to be queried.

20. A non-transitory computer readable storage medium, storing a computer program, wherein the computer program is executed by a processor to perform steps of the data processing method according to claim 1.

* * * * *